United States Patent [19]

Matsuura

[11] Patent Number: 4,949,024
[45] Date of Patent: Aug. 14, 1990

[54] CONTACTLESS PROFILING METHOD

[75] Inventor: Hitoshi Matsuura, Tokyo, Japan

[73] Assignee: Fanuc Ltd., Minamitsuru, Japan

[21] Appl. No.: 392,921

[22] PCT Filed: Nov. 25, 1988

[86] PCT No.: PCT/JP88/01194

§ 371 Date: Aug. 1, 1989

§ 102(e) Date: Aug. 1, 1989

[87] PCT Pub. No.: WO89/05212

PCT Pub. Date: Jun. 15, 1989

[30] Foreign Application Priority Data

Dec. 10, 1987 [JP] Japan .................. 62-312913

[51] Int. Cl.$^5$ .................. G01B 11/00; G05B 19/00; B23Q 35/128

[52] U.S. Cl. .................. 318/567; 318/572; 318/577; 364/513; 364/474.08; 356/375; 356/376

[58] Field of Search .................. 318/567, 570–578, 318/640, 568.15, 594; 356/370, 371, 372, 375, 376, 377, 369, 380, 386, 387; 364/474.03, 474.08, 513, 191, 193

[56] References Cited

U.S. PATENT DOCUMENTS

| | | | |
|---|---|---|---|
| 3,909,131 | 9/1975 | Waters .................. | 356/376 X |
| 3,986,774 | 10/1976 | Lowrey, Jr. et al. .................. | 356/376 X |
| 4,567,347 | 1/1986 | Ito et al. .................. | 356/376 X |
| 4,647,209 | 3/1987 | Neukomm et al. .................. | 356/376 |
| 4,651,283 | 3/1987 | Sciaky et al. .................. | 364/474.08 X |
| 4,708,482 | 11/1987 | Neiheisel .................. | 356/376 |
| 4,724,301 | 2/1988 | Shibata et al. .................. | 318/577 X |
| 4,725,145 | 2/1988 | Azzam .................. | 356/369 X |
| 4,747,574 | 5/1988 | Hofmann .................. | 356/376 X |
| 4,750,835 | 6/1988 | McMurtry .................. | 356/375 |
| 4,758,093 | 7/1988 | Stern et al. .................. | 356/376 |
| 4,770,537 | 9/1988 | Ito .................. | 356/372 |
| 4,798,469 | 1/1989 | Burke .................. | 356/376 |
| 4,835,718 | 5/1989 | Breyer et al. .................. | 364/513 X |
| 4,870,560 | 9/1989 | Seki et al. .................. | 364/474.08 X |

FOREIGN PATENT DOCUMENTS

WO83/00216  1/1983  PCT Int'l Appl. .................. 356/372

Primary Examiner—William M. Shoop, Jr.
Assistant Examiner—Paul Ip
Attorney, Agent, or Firm—Staas & Halsey

[57] ABSTRACT

A method for contactless profiling is performed while tilting an optic axis of a distance measuring probe (PB), which is capable of measuring a distance optically, by an angle $\theta$ from the vertical axis. When a point ($P_1$) at which distance measurement is impossible is reached and measurement of distance the thus becomes impossible, the movement of the distance measuring probe (PB) is halted and the distance measuring probe is rotated to tilt the optical axis thereof from the vertical axis by the angle $\theta$ in the opposite direction, after which contactless profiling is resumed. Thereafter, when the points ($P_2$, $P_3$) at which distance measurement is impossible are reached, the distance measuring probe (PB) is made to perform the same operations so that contactless profiling may continue.

18 Claims, 8 Drawing Sheets

CONTACTLESS PROFILING METHOD

FIELD OF THE INVENTION

This invention relates to a contactless profiling method and, more particularly, to a contactless profiling method for performing profiling while tilting a distance measuring probe.

DESCRIPTION OF THE RELATED ART

A contactless profiling method is available in which the surface of a model is traced by a probe sensor (a distance measuring probe), such as a laser distance measuring probe, that is capable of measuring distance contactlessly, whereby either profiling machining is performed in accordance with the model or the model surface data is digitized.

In general, the distance measuring probe used in such contactless profiling possesses a reference distance $L_0$, and it is arranged so that the difference between an actual measured distance L and the reference distance $L_0$ can be outputted as an error $_\Delta L$.

Figure 9:
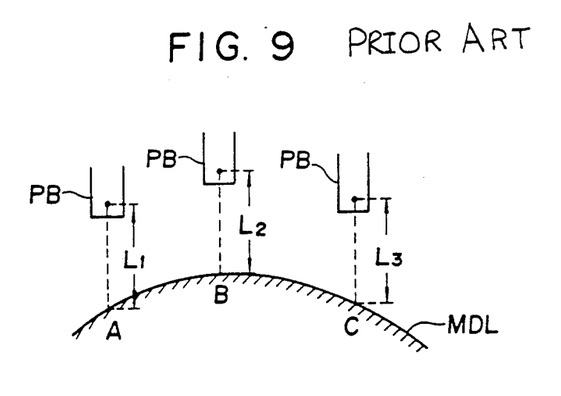
FIG. 9 is a view for describing the general features of contactless profiling.

FIG. 9 is a view for describing contactless profiling. Assume that a model MDL is to be profiled, and that points A, B, C are suitably selected sampling points. When a distance $L_1(=L_0+_\Delta L_1)$ at point A is measured, an error quantity of $_\Delta L_1$ in comparison with the reference distance $L_0$ is produced. The probe is then directed to the next sampling point B while a corrective operation is applied along the measurement axis (along the optic axis) in an amount corresponding to the error quantity. An error quantity $_\Delta L_2$ is then obtained at the point B and the probe is directed to point C so as to similarly apply a correction operation corresponding to the error quantity $_\Delta L_2$. By subsequently repeating identical processing, the model surface is traced contactlessly.

Figure 10:
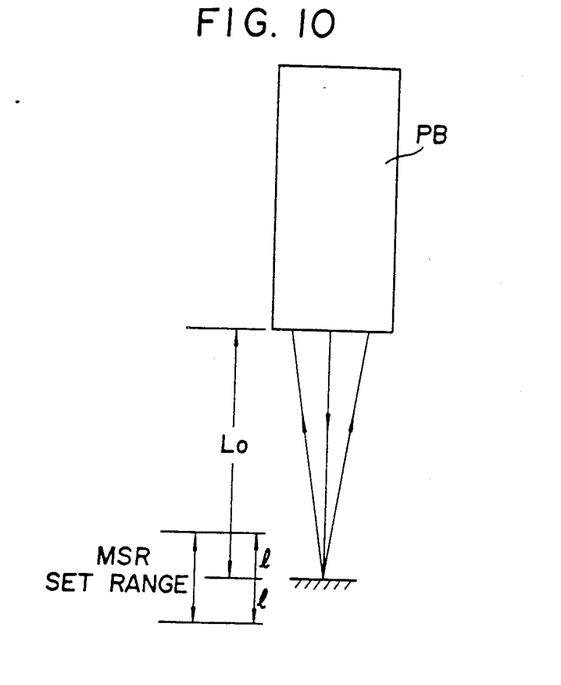
FIG. 10 is a view for describing a distance measuring probe.
Figure 11:
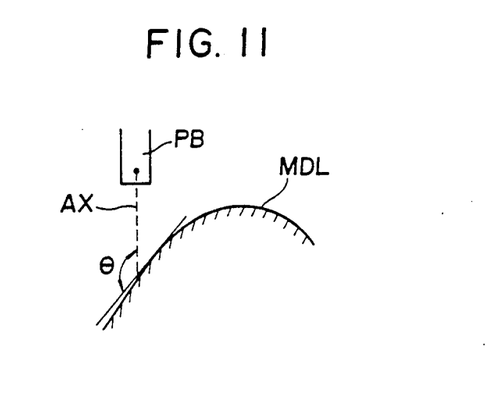
FIG. 11 is a view for describing a limit value on a model surface inclination angle at which distance measurement is possible.

An optical triangular measurement method, by way of example, can be employed with a contactless distance measuring probe. With such a probe, a laser beam emitted by a light-emitting element (semiconductor laser) is projected onto the model surface via a projecting lens, and a part of the diffusely reflected light beam forms a spot on a position detecting element via a light-receiving lens. Distance is measured by changing the spot position in dependence upon the distance to the model surface. Accurate measurement of distance cannot be performed unless the a sufficient amount of light enters the light-receiving lens. Consequently, there is a limitation upon the range of distance that can be measured accurately by a distance meausuring probe PB. In FIG. 10, a range equivalent to the reference distance $L_0 \pm 1$ is a measurable range MSR. In addition, the distance measuring probe PB has a limit value in terms of a model surface inclination angle $\theta$ (see FIG. 11) which is capable of being accurately measured; distance to a surface having an inclination angle greater than this limit angle cannot be measured. Hence, the with precision.

Figure 12:
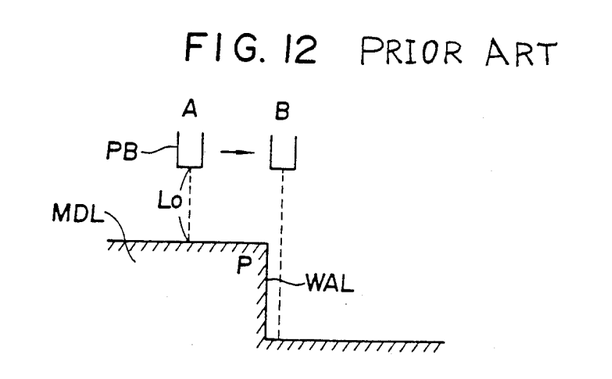
FIG. 12 is a view for describing the problems of the prior art.

As a result, if the model MDL has a wall WAL (irrespective of whether it is ascending or descending) defining nearly a right angle, as shown in FIG. 12, the distance cannot be measured at a corner portion P when the, distance measuring probe PB is moved from point A to point B. The prior art is such that when distance measurement becomes impossible, the probe PB is returned to point A by being moved in the opposite direction, speed is drastically reduced, the probe is again moved in the direction of point B while being raised and lowered to search for a position at which measurement becomes possible. When this position is found, ordinary contactless profiling is resumed from the position.

Thus, when distance measurement becomes impossible while using a prior-art contactless profiling method, a considerable period of time is required for normal contactless profiling to resume. As a result, neither high-speed contactless profiling machining nor digitizing of data by high-speed contactless profiling can be carried out.

Another problem with the prior-art method is that there is a large range in which exists distance cannot be measured, or in other words, a large range exists in which contactless profiling cannot be performed.

Accordingly, an object of the present invention is to provide a contactless profiling method in which normal contactless profiling can be resumed in a short period of time if distance measurement becomes impossible, and in which the range where profiling is impossible can be reduced.

SUMMARY OF THE INVENTION

In the contactless profiling method of the present invention, contactless profiling is performed while tilting an optic axis of a distance measuring probe by an angle $\theta$ from the vertical direction. If distance measurement becomes impossible, the movement of the distance measuring probe is stopped and the optic axis of the distance measuring probe is tilted from the vertical direction by the angle $\theta$ in the opposite direction, and contactless profiling is subsequently resumed. In accordance with this contactless profiling method, normal contactless profiling can be resumed after a short period of time even when the distance measurement of becomes impossible, and the range in which profiling is impossible can be substantially reduced.

DESCRIPTION OF THE PREFERRED EMBODIMENT

Figure 1:
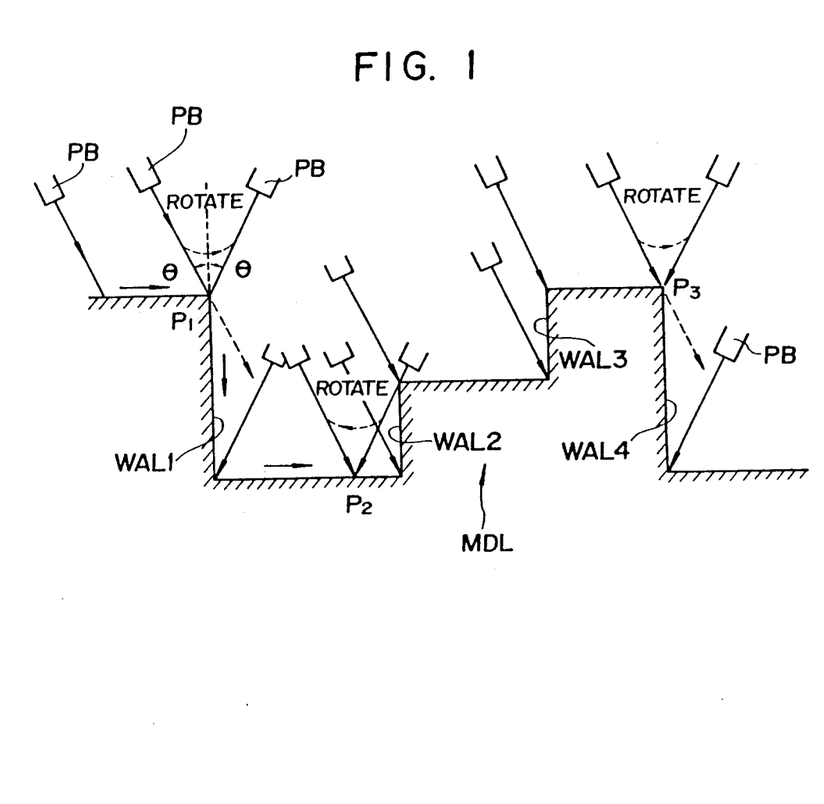
FIG. 1 is a view for describing the method of the present invention.

FIG. 1 is a view for describing the general features of the present invention, in which MDL denotes a model having ascending or descending walls WAL 1~WAL 4, PB represents a distance measuring probe capable of measuring distance contactlessly, and $P_1 \sim P_3$ denote points at which the distance cannot be measured.

Contactless profiling is performed while tilting the optic axis of the distance measuring probe PB by an angle $\theta$ from the vertical axis. When the point $P_1$ is reached and measurement of distance the becomes impossible, the movement of the distance measuring probe PB is halted and the optic axis thereof is tilted from the vertical direction by the angle $\theta$ in the opposite direction, and contactless profiling is subsequently resumed. Thereafter, when the points $P_2$, $P_3$ at which distance measurement is impossible are attained, the distance measuring probe PB is made to perform the same operations so that contactless profiling may continue.

Figure 2:
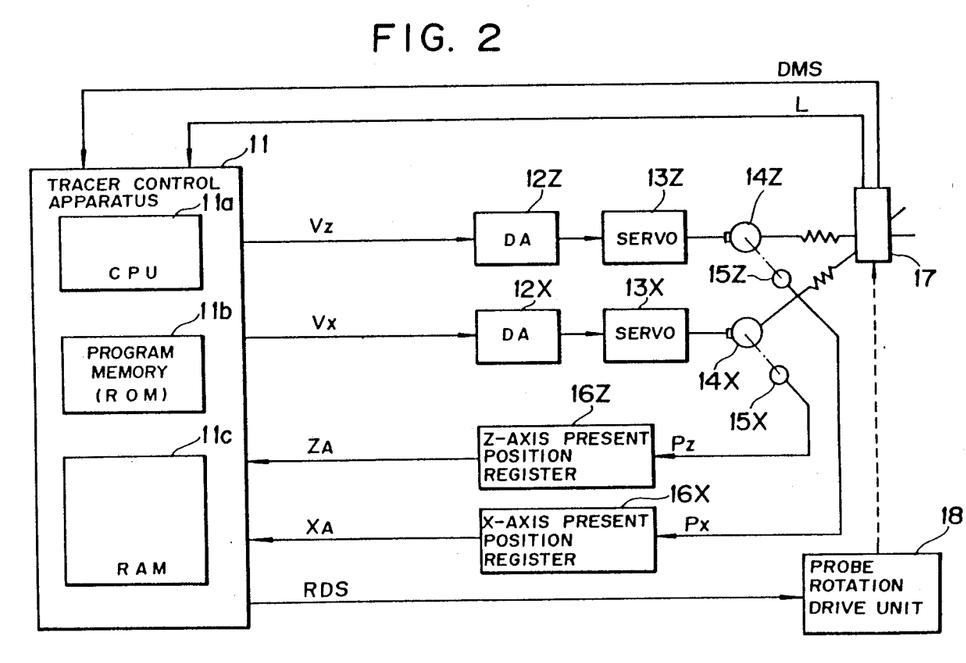
FIG. 2 is a block diagram of a system according to the present invention.

FIG. 2 is a block diagram of a system for practicing the contactless profiling method of the present invention.

Shown are a tracer control apparatus 11, DA converters for digital-to-analog converting digital axial velocity signals $V_z$, $V_x$ generated by the tracer control apparatus, servo-circuits 13Z, 13X for the respective axes, Z- and X-axis drive motors 14Z, 14X position detecting pulse coders 15Z, 15X for generating detection pulses $P_z$, $P_x$ whenever the corresponding motors rotate by a predetermined angle, present-position registers, for the respective axes, for monitoring present positions $Z_A$, $X_A$ along the axes by reversibly counting, in dependence upon direction of movement, the pulses generated by the corresponding pulse coders, a distance measuring probe (corresponding to the distance measuring probe PB of FIG. 1) 17 capable of measuring distance to a model surface contactlessly using a laser, and a probe rotation drive unit 18 for rotating the probe 17 when signaled by a rotation command RDS from the tracer control apparatus 11.

The tracer control apparatus 11 is computerized and, includes a processor (CPU) 11a, a program memory (ROM) 11b and a RAM 11c for storing the results of various processing. The tracer control apparatus 11 is adapted so as to be capable contactless profiling and digitizing processing. Though the portions relating to the Y axis are deleted from the block diagram of FIG. 2, it goes without saying that components the same as those associated with the other axes are also provided for the Y axis.

The distance measuring probe 17 is adapted so that its optic axis can be changed relative to a vertical axis. Let plus be the sign when the optic axis is tilted in the direction of travel from the vertical axis. In such case, contactless profiling is performed initially in a state where $-\theta$ (e.g., $\theta = 30°$) holds (see FIG. 1). Then, whenever distance measurement becomes impossible (at points $P_1$ –$P_3$), the inclination of the optic axis is changed from $-\theta$ to $+\theta$. or from + to $-\theta$.

Figure 3:
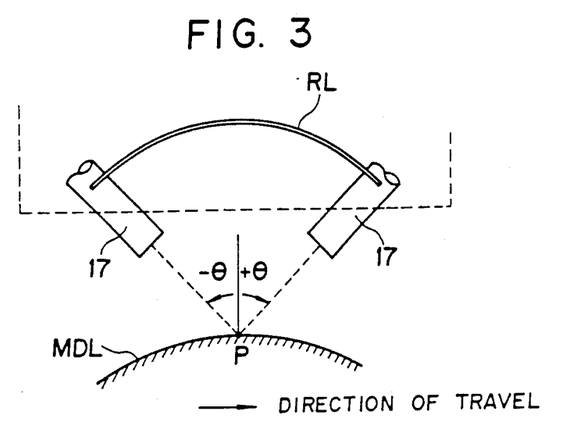
FIGS. 3 and 4 are views showing the principle of a probe rotating mechanism.
Figure 4:
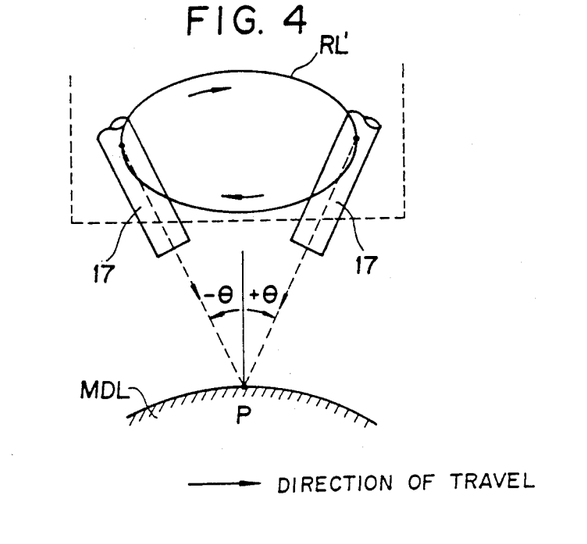

FIGS. 3 and 4 are views for describing the principle of the mechanism which changes the inclination of the optic axis. FIG. 3 shows that by moving the probe 17 mechanically along a rail RL, the optic axis will be changed between $\pm\theta$ in the direction of travel without altering a measurement point P on the model MDL. FIG. 4 shows that by rotating the probe 17 180° along a horizontally disposed, circular rail RL', the optic axis will also be changed between $\pm\theta$ in the direction of travel without altering the measurement point P on the model MDL.

The distance measuring probe 17 checks whether the quantity of detected light is greater than a set value, in order to determine whether correct distance measurement is possible. The arrangement is such that if the detected light quantity is greater than the set value, a high-level distance measurement signal DMS is output from the distance measuring probe 17.

The present invention will now be described with regard to a case where digitizing is performed while contactless profiling is carried out. It will be assumed that the optic axis of the distance measuring probe 17 initially is tilted by $-\theta$ from the vertical axis (see FIG. 1).

When contactless profiling starts and measured distance L is measured by the probe 17, the processor 11a calculates the error $_\Delta L$ between reference distance $L_o$ and the measured distance L and calculates a normal-direction velocity signal $V_N$ and a tangential-direction velocity signal $V_T$ in accordance with a $_\Delta L - V_N$ characteristic and a $_\Delta L - V_T$ characteristic.

Figure 5:
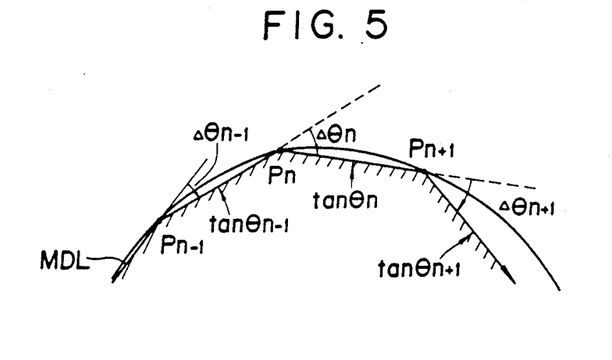
FIG. 5 is a view for describing calculation of profiling direction in contactless profiling.

The time from the start of contactless profiling is divided at a predetermined sampling time $T_s$. The processor 11a calculates a profiling direction $\theta_{n+1}$ in a current time slot in accordance with $$\theta_n + (1/K)\Delta\theta_n \rightarrow \theta_{n+1} \quad (1)$$

using the difference $\Delta\theta_n$ between the profiling direction $\theta_{n-1}$ (see FIG. 5) in a time slot that is two time slots earlier and a profiling direction $\theta_n$ in a time slot that is one time slot earlier, and the profiling direction $\theta_n$ in the time slot that is one time slot earlier (where K is a suitably decided constant, usually ½).

When the velocity signals $V_N$, $V_T$ and profiling direction have been found, the processor 11a generates the velocity signals $V_x$, $V_z$ along the respective axes in accordance with the equations $$V_T \cos\theta_{n+1} \rightarrow V_x \quad (2)$$

$$V_T \sin\theta_{n+1} \rightarrow V_z \quad (3)$$

and applies the profiling velocity signals $V_x$, $V_z$ along the respective axes to the motors 14X, 14Z via the DA converters 12X, 12Z and servo-circuits 13X, 13Z, thereby causing the distance measuring probe 17 to move along each of the axes simultaneously to trace the model surface. As a result, the probe 17 is moved in the direction $\theta_{n+1}$ calculated by the processor 11a.

Figure 6:
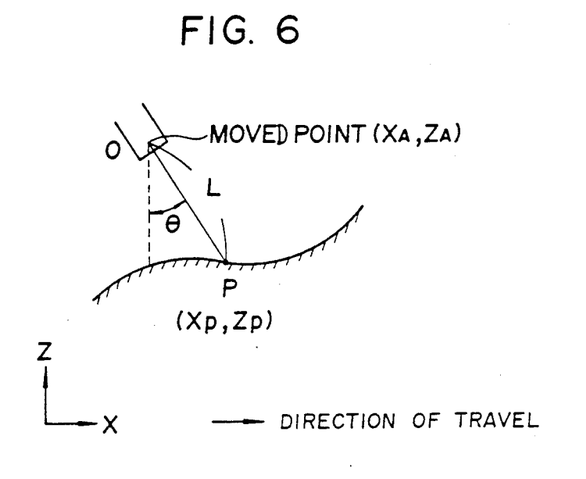
FIG. 6 is a view for describing correction of position data.

In parallel with the foregoing contactless profiling control operation, the processor 11a digitizes the model surface by reading in the present axial position data $Z_A$, $X_A$ from the present axis registers 16Z, 16X every predetermined sampling time $T_s$. Since the optic axis is tilted, a correction is necessary because $Z_A$, $X_A$ cannot be used as surface data as they are. FIG. 6 is a view for describing the principle of position data correction processing. Letting L represent the measured distance and $\theta$ the angle of inclination, the coordinates $X_P$, $Z_P$ of the measurement point P are given by the equations $$X_P = X_A \pm L \cdot \sin\theta \quad (4)$$

$$Z_P = Z_A \pm L \cdot \cos\theta \quad (5)$$

In Eq. (4), the plus sign is for a case where the optic axis is tilted in the direction opposite that of the direction of travel (the +X direction), and the minus sign is for when the optic axis is tilted in the direction of travel.

In parallel with the digitizing processing by contactless profiling, the processor 11a refers to the distance measurement signal DMS to check whether a position has been reached at which distance measurement is impossible.

When a point (e.g., $P_1, P_2, P_3$, etc., in FIG. 1) at which distance measurement is impossible has been reached so that the distance measurement signal DMS assumes a low level, contactless profiling is stopped immediately to halt movement of the probe 17.

Thereafter, the processor 11a applies the rotation drive signal RDS to the probe rotation drive unit 18, causing the latter to rotate the probe 17 so that the optic axis thereof is controlled to tilt in the opposite direction by $\theta$ from the vertical axis (see the probe inclination at points $P_1-P_3$ in FIG. 1).

If the optic axis is tilted from the vertical axis by $\theta$ in the direction of travel immediately after profiling is halted, the probe is rotated ($+\theta \rightarrow -\theta$) so as to tilt by $\theta$ in the direction opposite the direction of travel. If the optic axis is tilted from the vertical axis by $\theta$ in the direction opposite the direction of travel immediately after profiling is halted, the probe is rotated ($-\theta \rightarrow +\theta$) so as to tilt by $\theta$ in the direction of travel.

Figure 7A:
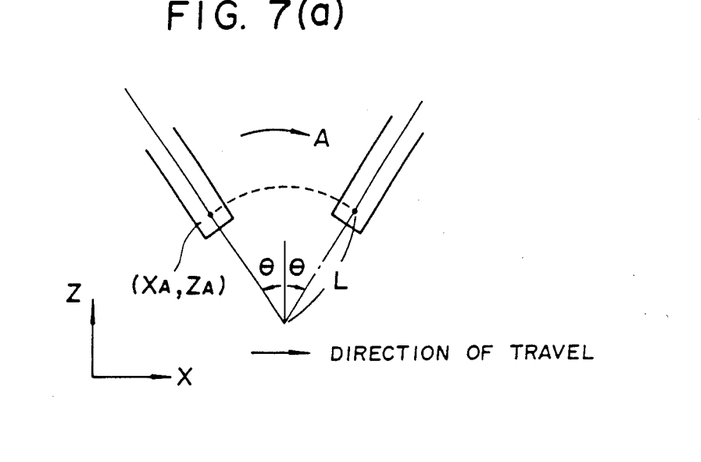
FIGS. 7(a) and 7(b) are views for describing correction of present position data after probe rotation.
Figure 7B:
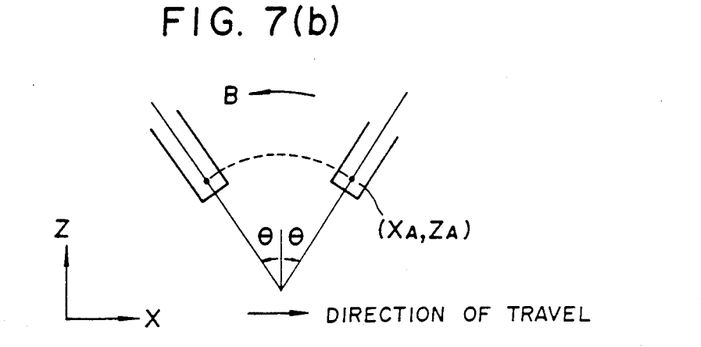

The present position of the probe changes as a result of this rotation. Subsequently, therefore, the present position is corrected in accordance with the following formulae:

$$X_A + 2 \cdot L \cdot \sin\theta \rightarrow X_A \quad (6)$$

$$Z_A \rightarrow Z_A$$

in a case where the probe is rotated in the direction of travel (the $+X$ direction), as indicated by arrow A in FIG. 7(a), and in accordance with the following formulae:

$$X_A - 2 \cdot L \cdot \sin\theta \rightarrow X_A \quad (7)$$

$$Z_A \rightarrow Z_A$$

in a case where the probe is rotated in the direction opposite the direction of travel, as indicated by arrow B in FIG. 7(b).

Since distance measurement is made possible by rotating the probe, digitizing of the surface by contactless profiling can thereafter be executed. The probe is rotated in similar fashion whenever the distance measurement becomes impossible, thereby enabling the contactless profiling to continue.

Figure 8A:
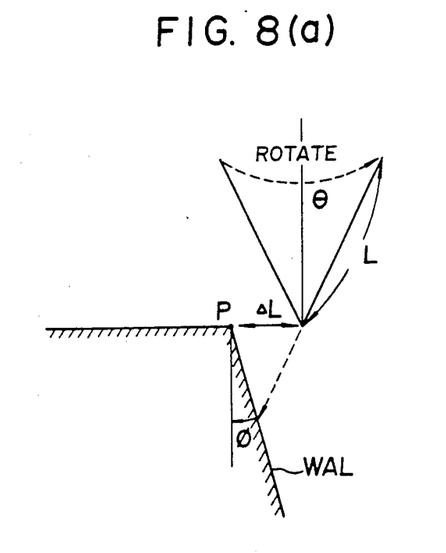
FIGS. 8(a) and 8(b) are views for describing a range in which profiling cannot be performed.

FIG. 8 is a view for describing a range in which contactless profiling cannot be carried out. Namely, there is a range in which digitizing cannot be performed, for example, in a case where the probe is stopped at a point where measurement is impossible and the optic axis is subsequently rotated to resume contactless profiling in accordance with the invention. Assume that the feed velocity of the distance measuring probe is V mm/sec, the inclination angle thereof is $\theta$, the angle the wall WAL forms with a vertical plane is $\phi$ and the sampling time is $T_s$ (ms). In such case, maximum overshoot $\Delta L$ [see FIG. 8(a)] is as follows when the probe is brought to an instantaneous stop at detection of the fact that measurement is impossible:

$$\Delta L = T_s \cdot V / 1000 \text{ mm} \quad (8)$$

Figure 8B:
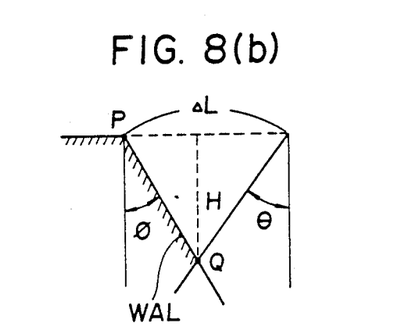

A vertical distance H from the uppermost point P of the wall WAL to a position Q [see FIG. 8(b)] at which the light beam strikes is as follows:

$$H = \Delta L / (\tan\theta + \tan\phi) \quad (9)$$

For example, if V = 100 mm/sec, $T_s$ = 2 msec, $\theta = 30°$ and $\phi = 0°$, then $$H = 0.2/0.58 = 0.3 \text{ mm}$$

That is, digitizing of the wall surface will resume from a position about 300 μm lower in the height direction and no precision-related problems will arise.

Thus, in accordance with the present invention, contactless profiling is performed while tilting an optic axis of a distance measuring probe by an angle $\theta$ from the vertical direction. If measurement of the distance becomes impossible, movement the of the distance measuring probe is stopped and the optic axis of the distance measuring probe is tilted from the vertical direction by the angle $\theta$ in the opposite direction, and contactless profiling is subsequently resumed. Accordingly, normal contactless profiling can be resumed in a short period of time even when measurement of distance becomes impossible owing to enlarged inclination of the model surface. Moreover, the range in which profiling is impossible is reduced, so that there is no decline in profiling precision. The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

What is claimed is:

1. A contactless profiling method for tracing a model surface using an optical distance measuring probe capable of contactlessly measuring a distance L to the model surface, said method comprising the steps of:
    (a) performing contactless profiling while tilting an optical axis of the optical distance measuring probe by an angle $\theta$ in a first direction from a vertical axis;
    (b) stopping movement of the optical distance measuring probe if measurement of the distance becomes impossible; and
    (c) tilting the optical axis of the optical distance measuring probe from the vertical axis by the angle $\theta$ in a second direction after said stopping in step (b); and
    (d) resuming contactless profiling after said tilting in step (c).

2. A contactless profiling method according to claim 1, wherein the optical distance measuring probe outputs a distance measurement signal, and
    wherein said method further comprises the steps of:
    (e) indicating distance measurement is possible, when a light quantity detected by the optical distance measuring probe is greater than a predetermined value, with the distance measurement signal; and
    (f) determining whether the distance measurement is possible/impossible based on the distance measurement signal.

3. A contactless profiling method according to claim 1, wherein said method further comprises the step (e) calculating coordinates $X_p$, $Z_p$ of a measurement point on the model surface when the optical axis of the optical distance measuring probe is titled from the vertical axis by the angle $\theta$ in a direction of travel or by the angle $-\theta$ in a direction opposite the direction of travel in accordance with the following equations:

$$X_p = X_A \pm L \cdot \sin\theta$$

$$X_p = Z_A \pm L \cdot \cos\theta$$

using coordinates $X_A$, $Z_A$ of a present position of the optical distance measuring probe.

4. A contactless profiling method according to claim 3, wherein step (c) comprises the substep of updating the present position of the optical distance measuring probe after said tilting.

5. A contactless profiling method according to claim 4, wherein said updating of the present position is based on the following formula $X_A = X_A + 2 \cdot L \cdot \sin\theta$.

6. A contactless profiling method according to claim 4, wherein said updating of the present position is based on the following formula $X_A = X_A - 2 \cdot L \cdot \sin\theta$.

7. A contactless profiling method according to claim 1, wherein said method further comprises the step of profile machining a workpiece in accordance with the distance measured.

8. A method for contactlessly tracing a model surface using an optical distance measuring probe, the optical distance measuring probe has a vertical axis and an optical axis, said method comprising the steps of:
 (a) tilting the optical distance measuring probe from the vertical axis by a predetermined angle;
 (b) determining whether a distance from the optical distance measuring probe to the model surface can be measured by the optical distance measuring probe having a present tilt;
 (c) tilting the optical distance measuring probe from the vertical axis by the predetermined angle in a direction opposite to the present tilt when said determining in step (b) determines the distance cannot be measured; and
 (d) measuring the distance from the optical distance measuring probe to the model surface.

9. A method according to claim 8, wherein said method further comprises the step of repeating steps (b)–(d) until the model surface has been completely traced.

10. A method according to claim 8, wherein said method further comprises the steps:
 (e) computing a surface point of the model surface based on the distance measured in step (d); and
 (f) processing the surface point to correct for the present tilt in the optical distance measuring probe.

11. A method according to claim 10, wherein said method is performed by a tracer control apparatus having a processor and a memory unit, and
 wherein said method further comprises the step of storing the surface point in the memory unit for machining of a workpiece at a later time.

12. A method according to claim 10, wherein step (e) includes the steps of:
 (e1) computing first and second axis position data of the optical distance position measuring probe; and
 (e2) computing first and second surface point coordinates of the surface point, and
 wherein step (f) includes the steps of:
 (f1) correcting the first surface point coordinate by adding, when the optical axis is tilted in a direction opposite to a traveling direction of the optical distance measuring probe, or subtracting, when the optical axis is tilted in the traveling direction, a first quantity from the first axis position data; and
 (f2) correcting the second surface point coordinate by adding, when the optical axis is tilted in a direction opposite to a traveling direction of the optical distance measuring probe, or subtracting, when the optical axis is tilted in the traveling direction, a second quantity from the second axis position data.

13. A method according to claim 12, wherein the first quantity is determined by multiplying the distance by sin of the predetermined angle, and the second quantity is determined by multiplying the distance by cos of the predetermined angle.

14. A method as recited in claim 8, wherein said method further comprises the step of profile machining a workpiece in accordance with the distance measured in step (d).

15. A method according to claim 8, wherein the optical distance measuring probe includes a light-emitting element and a light-receiving element, and
 wherein said determining in step (b) comprises the steps:
 (b1) emitting light from the light-emitting element onto the model surface;
 (b2) receiving a quantity of reflected light from the model surface at the light-receiving element; and
 (b3) comparing the quantity of reflected light with a predetermined quantity.

16. A method according to claim 8, wherein the optical distance measuring probe includes has a present position, and
 wherein step (c) comprises the step of updating the present position of the optical distance measuring probe after said tilting.

17. A system for contactlessly tracing a model surface, comprising:
 distance measuring means, having optical axis with a present tilt about a vertical axis by a predetermined angle, for determining whether a distance to the model surface can be measured, and for measuring the distance to the model surface;
 rotation drive means for tilting said distance measuring means about the vertical axis by the predetermined angle in a direction opposite to the present tilt when said distance measuring means determines the distance cannot be measured at the present tilt; and
 control means for controlling the tilting by said rotation drive means when said distance measuring means determines the distance cannot be measured at the present tilt.

18. A system according to claim 17, wherein said control means comprises:
 means for computing a surface point of the model surface based on the distance measured by said distance measuring means;
 means for processing the surface point to correct for the present tilt of said measuring means; and
 means for updating the present position of said distance measuring means after the tilting by said rotation drive means.

* * * * *

UNITED STATES PATENT AND TRADEMARK OFFICE
CERTIFICATE OF CORRECTION

PATENT NO. :   4,949,024
DATED      :   August 14, 1990
INVENTOR(S) :  Matsuura

It is certified that error appears in the above-identified patent and that said Letters Patent is hereby corrected as shown below:

FRONT PAGE [57], in the Abstract, line 6, "of distance the" should be --of the distance--.

Col. 1,   line 48, "the a" should be --a--;

line 52, "±1" should be --±$\ell$--;

line 56, "measured; distance" should be --measured. Hence, the distance--;

line 58, "Hence, the with precision." should be deleted.

Col. 2,   line 12, "exists" should be --the--.

Col. 3,   line 7, "of distance the" should be --of the distance--;

line 55, ". or" should be --or--, and "+ to -θ." should be --+θ to -θ.--.

UNITED STATES PATENT AND TRADEMARK OFFICE
CERTIFICATE OF CORRECTION

PATENT NO. : 4,949,024

DATED : August 14, 1990

INVENTOR(S) : Matsuura

It is certified that error appears in the above-identified patent and that said Letters Patent is hereby corrected as shown below:

Col. 4, line 12, "and measured" should be
   --and a measured--.

Col. 5, line 44, "there after" should be --thereafter--.

Col. 6, line 14, "movement the of the" should be
   --the movement of the--.

Col. 8, line 35, "includes has a" should be --includes a--.

Signed and Sealed this

Nineteenth Day of May, 1992

Attest:

DOUGLAS B. COMER

*Attesting Officer*    Acting Commissioner of Patents and Trademarks